UNITED STATES PATENT OFFICE.

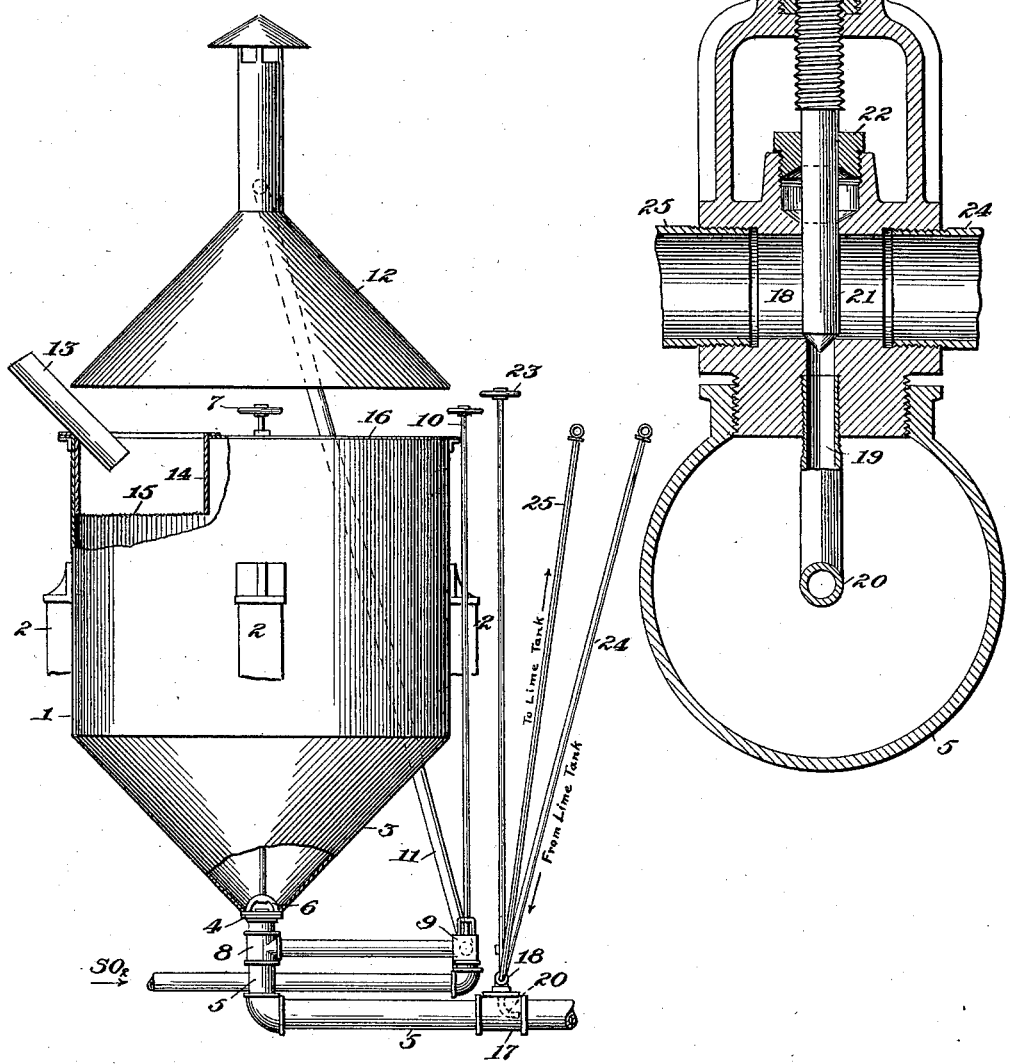

EUGENE W. DEMING, OF NEW YORK, N. Y.

APPARATUS FOR TREATING CANE-JUICE.

996,911. Specification of Letters Patent. Patented July 4, 1911.

Application filed February 26, 1907. Serial No. 359,413.

*To all whom it may concern:*

Be it known that I, EUGENE W. DEMING, a citizen of the United States, residing at New York, in the county of New York and State of New York, have invented certain new and useful Improvements in Apparatus for Treating Cane-Juice, of which the following is a specification.

This invention is an apparatus intended especially for the treatment of raw juices from sugar cane or the like, the objects of the invention being to provide means whereby such juices may be treated in a substantially continuous manner with determined proportions of sulfur dioxid and lime, and whereby the quantity of raw juice in transit may be greatly reduced.

It is now customary to conduct the juice from the milling plant to so-called liming-tanks, usually three in number, each having a capacity corresponding to the production of the mill in about one-half hour; thus a factory consuming one thousand tons of cane per day will usually have in transit some six thousand gallons of raw juice undergoing a constant and rapid deterioration. According to the usual practice sulfur dioxid is introduced into this raw juice either on its way to the liming-tanks or in these tanks, and lime is thereafter applied in the tanks and mixed with the juice before pumping the latter to the heating apparatus. According to the present invention the quantity of raw juice in transit is reduced to an amount barely sufficient for affording a safe margin for the juice pump under the conditions of variable supply from the mill, sulfur dioxid and lime being applied in regulated amounts to the flowing body of juice.

For a full understanding of my invention reference is made to the accompanying drawing showing one embodiment thereof, wherein:

Figure 1 is an elevation partly broken away showing a preferred form of juice tank and the means for applying sulfur dioxid and lime to the juice; and Fig. 2 is a central vertical section on an enlarged scale through the lime valve.

Referring to the drawings, 1 represents a tank of suitable dimensions, which will depend upon the capacity of the mill and the regularity of supply; for a mill of the capacity above noted the diameter of this tank may be approximately 8 feet. The tank 1 is carried by suitable supports 2, and is preferably provided with a converging bottom 3. The bottom outlet 4 for juice is controlled by a valve 6 having a conveniently disposed hand-wheel 7. The sulfur is burned under pressure in a suitable closed furnace, as is well understood in the art, and the sulfur dioxid is introduced into the main juice line 5, preferably at the point 8 directly beneath the discharge aperture of the tank 1. The supply of sulfur dioxid to the juice is controlled by a three-way cock 9 having a stem 10 extending upward to a convenient point for control. A vent pipe 11 extends upwardly from the three-way cock and discharges beneath a hood 12 projecting above the roof line; this hood may conveniently cover the tank 1 as shown to convey away any sulfur fumes which may at any time escape through the body or column of juice in the tank 1.

The juice will preferably flow from the mill to a suitable automatic weighing machine where the quantity produced will be recorded; it passes thence by a trough 13 to the tank 1, discharging into an open juice-box 14 provided with a strainer 15, usually of perforated sheet brass or of brass wire cloth of sufficiently fine mesh to arrest any cane fiber or the like carried by the juice. The portion of the tank 1 which is not occupied by the juice-box 14 is preferably covered as shown at 16, the purpose of this construction being to aid the absorption of the sulfur dioxid by insuring that any gas which may escape solution in the juice line 5 or in the column of juice in the tank 1 shall pass upward through the strainer 15 and encounter the fresh juice entering the juice-box.

The lime is introduced into the main juice line 5, preferably at a point 17 sufficiently removed from the point of application of sulfur dioxid to insure an even distribution of the latter through the juice. The lime is usually supplied as milk of lime of 12°–15° Baumé, and under conditions which insure a regular supply without danger of clogging due to the deposit of lime from suspension. For this purpose I provide a special construction of lime valve shown in detail in Fig. 2.

The milk of lime is prepared in a suitable mixing tank as usual, and is then forced under pressure to and through a valve-casing 18, which communicates through a tube or aperture 19 with the main juice line 5, the lime supply jet extending preferably to the center of the juice conduit and being preferably turned in the direction of flow of the juice as indicated at 20, Figs. 1 and 2. The supply of lime to the juice is regulated by a needle valve 21, extending through a stuffing box 22, and adjustable by a hand-wheel 23. The lime in suspension and solution is forced continuously through the casing 18, being supplied thereto by a pipe 24, the excess returning to the mixing tank through pipe 25, these parts constituting a circulating system for the milk of lime. It will be observed that the casing 18 affords no opportunity for the lodgment of lime, and the flow therethrough should be sufficient to prevent clogging either in the casing or in the connecting pipes.

The lime pipes 24, 25 should extend above the juice level in tank 1 in order to afford such excess pressure of the milk of lime as will insure its entry into the juice line whenever the needle valve 21 is open. It is obviously desirable that the sulfur dioxid line should also extend at some point above the juice level in order to prevent the entry of juice into the sulfur burner when the pressure therein is relieved.

Obviously the lime may be introduced into the flowing body of juice at any desired point in its transit instead of into the closed pipe system as shown.

It is found that the juice pump, which in practice is interposed between the point of supply of lime and the heating or superheating apparatus for the juice, constitutes an effective mixer for the lime when the supply of lime is continuous and is proportionate to the volume of juice to be treated, although such bends as may be necessary to secure perfect mixing may be introduced into the juice line. The quantity of lime introduced into the juice will usually be such as to nearly or quite neutralize the normal acidity of the juice together with the additional acidity due to the sulfur dioxid, as is well understood; this quantity is usually determined by testing the heated juice at suitable intervals.

I claim:

1. In apparatus for treating cane juice or the like, a closed conduit for juice, a casing arranged in proximity thereto, a valved connection between said casing and conduit, means for establishing a flow of juice through said conduit, and means for maintaining a continuous circulation of milk of lime through said casing.

2. In apparatus for treating cane juice or the like, a closed conduit for juice, a casing arranged in proximity thereto, a valved pipe connection between said casing and conduit, said pipe connection extending into the axial region of the juice conduit, means for establishing a flow of juice through said conduit, and means for maintaining a continuous circulation of milk of lime through said casing.

3. Apparatus for treating cane juice or the like, comprising a tank having a bottom discharge, a juice line connected therewith, means for introducing sulfur dioxid into the juice, and means for diverting a regulated proportion of said sulfur dioxid.

4. Apparatus for treating cane juice or the like, comprising a juice tank, means for supplying sulfur dioxid to the juice, a juice inlet in the upper portion of the tank, a strainer for said inlet, and a cover for said tank arranged to divert any excess of sulfur dioxid through said strainer and into contact with the juice entering the tank.

In testimony whereof, I affix my signature in presence of two witnesses.

EUGENE W. DEMING.

Witnesses:
A. M. BACON,
B. W. BATES.

---

Copies of this patent may be obtained for five cents each, by addressing the "Commissioner of Patents, Washington, D. C."